(12) United States Patent
Liao et al.

(10) Patent No.: US 10,739,528 B1
(45) Date of Patent: Aug. 11, 2020

(54) OPTICAL TRANSCEIVER AND OPTICAL SUBASSEMBLY THEREOF

(71) Applicant: Prime World International Holdings Ltd., New Taipei (TW)

(72) Inventors: Ting-Jhang Liao, New Taipei (TW); Yi-Ju Wang, New Taipei (TW); Ming-You Lai, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/288,507

(22) Filed: Feb. 28, 2019

(51) Int. Cl.
*G02B 6/38* (2006.01)
*G02B 6/42* (2006.01)

(52) U.S. Cl.
CPC ......... *G02B 6/3825* (2013.01); *G02B 6/3838* (2013.01); *G02B 6/3869* (2013.01); *G02B 6/4261* (2013.01)

(58) Field of Classification Search
CPC .. G02B 6/3825; G02B 6/3838; G02B 6/3869; G02B 6/4261

USPC .......................................................... 385/78
See application file for complete search history.

(56) References Cited

U.S. PATENT DOCUMENTS

| 4,268,115 A | * | 5/1981 | Slemon | G02B 6/3825 385/88 |
| 2009/0263087 A1 | * | 10/2009 | Oshima | G02B 6/4207 385/88 |
| 2012/0099099 A1 | * | 4/2012 | Tudury | G01M 11/335 356/73.1 |

FOREIGN PATENT DOCUMENTS

JP  57017912 A * 1/1982 ........... G02B 6/3825

* cited by examiner

*Primary Examiner* — Jerry M Blevins
(74) *Attorney, Agent, or Firm* — Grossman Tucker Perreault & Pfleger, PLLC

(57) ABSTRACT

An optical subassembly includes a receptacle, a ferrule and a ferrule fastening component. The ferrule and the ferrule fastening component are connected with the receptacle. The ferrule fastening component includes a fastening portion and a blocking portion connected with each other. The fastening portion is fastened with the receptacle, and the blocking portion touches the ferrule.

15 Claims, 6 Drawing Sheets

OPTICAL TRANSCEIVER AND OPTICAL SUBASSEMBLY THEREOF

BACKGROUND

Technical Field

The disclosure relates to an optical communication device, more particularly to an optical transceiver.

Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications such as XFP (10 Gigabit Small Form Factor Pluggable) used in 10 GB/s communication rate, QSFP (Quad Small Form-factor Pluggable), or other form factors at different communication rates have been proposed and employed.

Generally, an optical subassembly in the optical transceiver includes a package, a receptacle, and a ferrule for constructing optical fiber cables and assemblies. The ferrule is adhered to the receptacle by glue.

SUMMARY

According to one aspect of the present disclosure, an optical subassembly includes a receptacle, a ferrule and a ferrule fastening component. The ferrule and the ferrule fastening component are connected with the receptacle. The ferrule fastening component includes a fastening portion and a blocking portion connected with each other. The fastening portion is fastened with the receptacle, and the blocking portion touches the ferrule.

According to another aspect of the present disclosure, an optical transceiver an optical transceiver includes the aforementioned optical subassembly.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
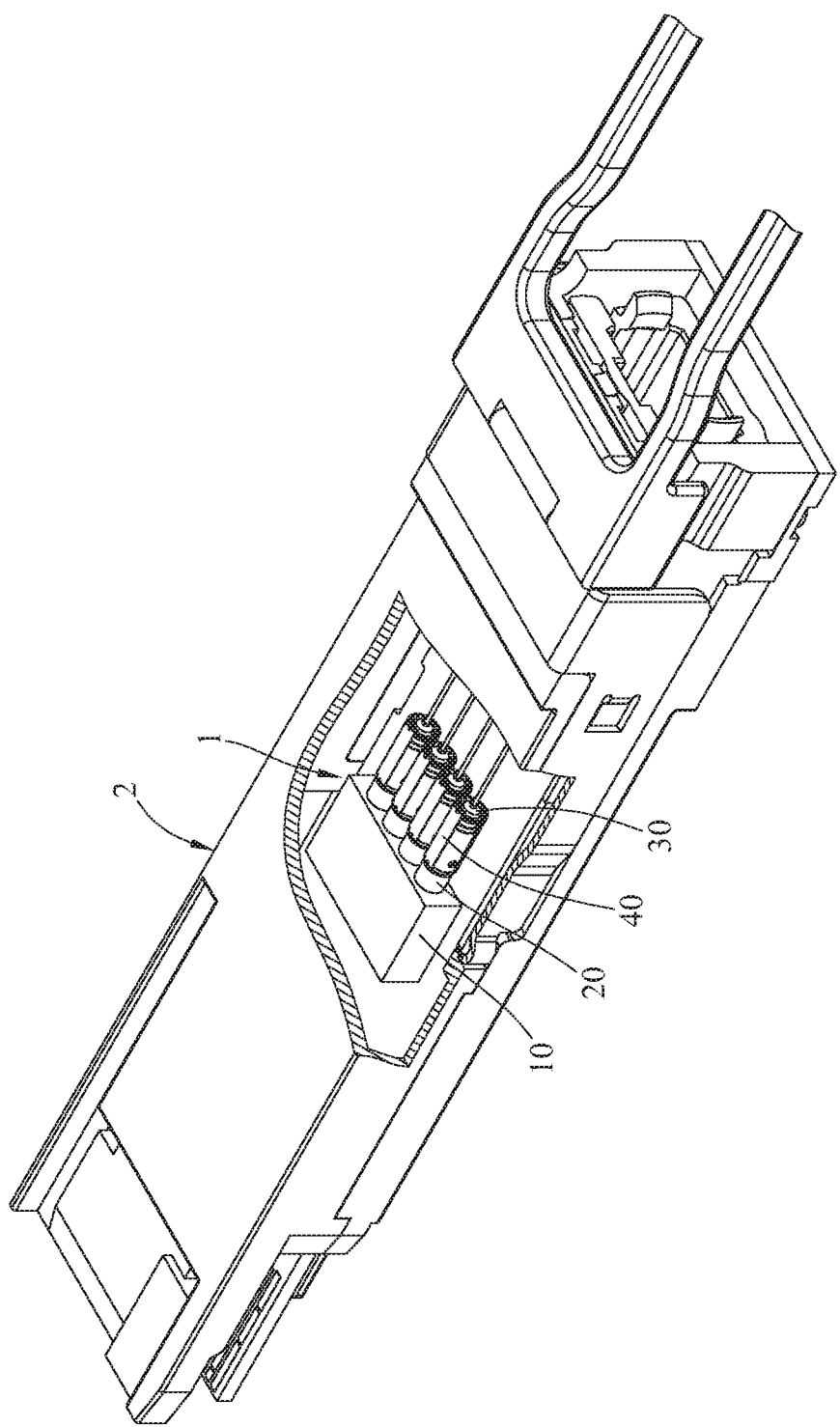
FIG. 1 is a perspective view of an optical transceiver according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
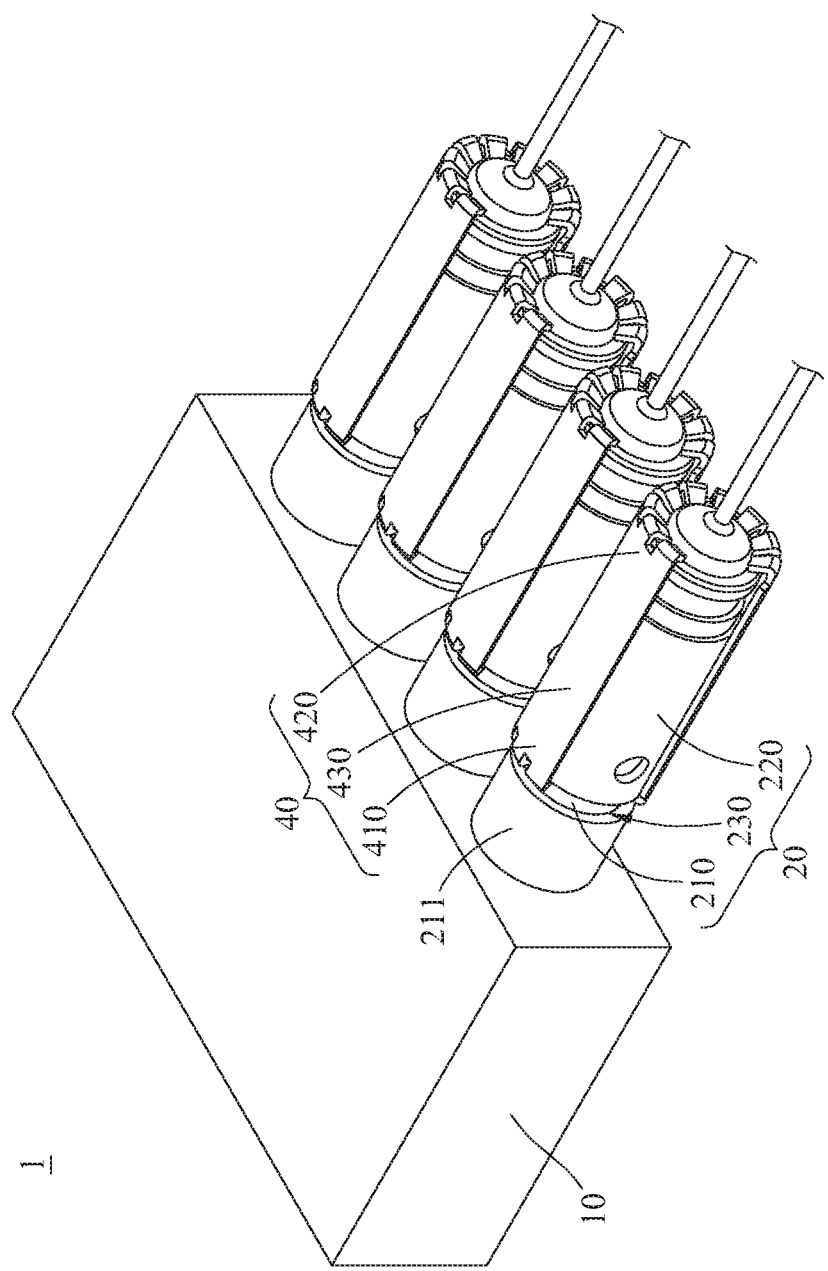
FIG. 2 is a perspective view of an optical subassembly in the optical transceiver of FIG. 1.
Figure 3:
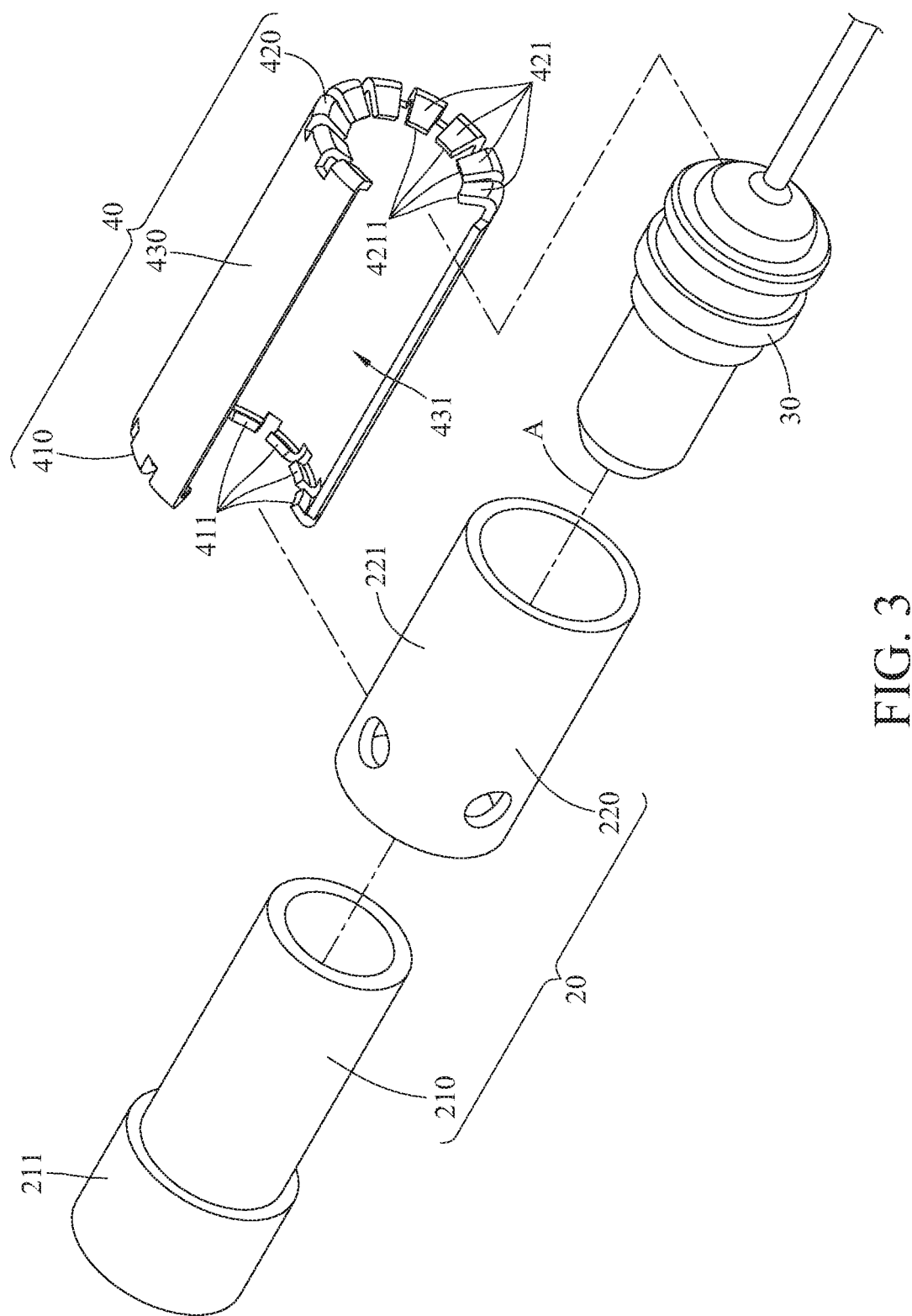
FIG. 3 is an exploded view of the optical subassembly in FIG. 2.

According to one embodiment of the present disclosure, an optical subassembly includes a receptacle, a ferrule and a ferrule fastening component. Please refer to FIG. 1 through FIG. 3. FIG. 1 is a perspective view of an optical transceiver according to an embodiment of the present disclosure. FIG. 2 is a perspective view of an optical subassembly in the optical transceiver of FIG. 1. FIG. 3 is an exploded view of the optical subassembly in FIG. 2. In this embodiment, an optical transceiver, which is insertable into a cage in a pluggable manner, includes an optical subassembly 1 and a casing 2 configured to accommodate the optical subassembly 1. The optical subassembly 1 includes a package 10, at least one receptacle 20, at least one ferrule 30 and at least one ferrule fastening component 40. The optical subassembly 1 is a transmitter optical subassembly (TOSA) or a receiver optical subassembly (ROSA) in the optical transceiver. It is worth noting that the protective scope of the present disclosure is not limited to the numbers of receptacle 20, ferrule 30 and ferrule fastening component 40 shown in FIG. 1.

The package 10, for example, is a ceramic cap in which bonding wires, pins, optical lens and IC chip are accommodated. The receptacle 20 is connected with the package 10. The ferrule 30 is connected with the receptacle 20. The ferrule fastening component 40, for example, is an arc-shaped elastic metal clip. The ferrule fastening component 40 is disposed around the receptacle 20 and includes a fastening portion 410 and a blocking portion 420 connected with each other. The fastening portion 410 is fastened with the receptacle 20, and the blocking portion 420 touches the ferrule 30.

Figure 4:
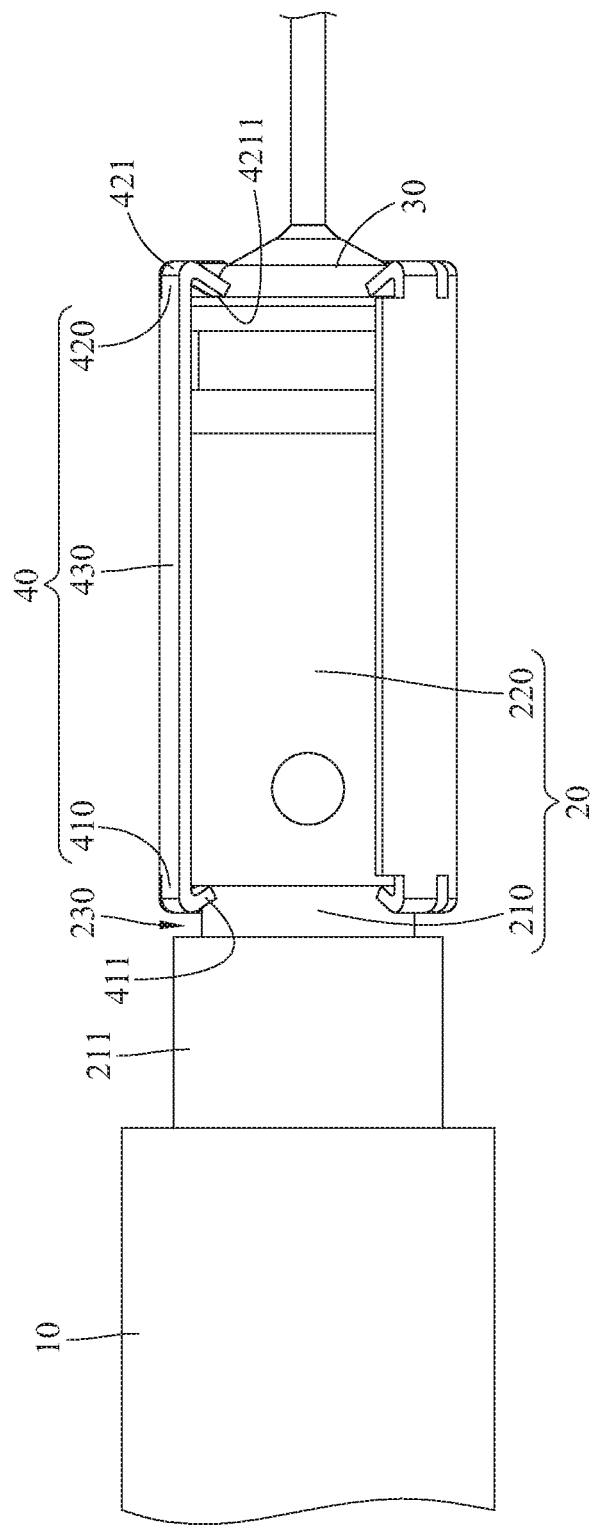
FIG. 4 is a side view of the optical subassembly in FIG. 2.

According to one embodiment of the present disclosure, the receptacle includes an axial portion and an assembling portion. Please refer to FIG. 4, which is a side view of the optical subassembly in FIG. 2. As shown in FIG. 3 and FIG. 4, the receptacle 20 includes an axial portion 210 and an assembling portion 220. The axial portion 210 is connected with the package 10 through a flange 211. The assembling portion 220 is sleeved on the axial portion 210. The flange 211 of the axial portion 210 and the assembling portion 220 jointly form a groove 230 therebetween. The fastening portion 410 of the ferrule fastening component 40 includes a hook structure 411 extending into the groove 230 of the receptacle 20, allowing for the fastening portion 410 to be fastened with the assembling portion 220.

According to one embodiment of the present disclosure, the ferrule fastening component further includes a connecting portion. A shown in FIG. 3 and FIG. 4, the ferrule fastening component 40 includes a connecting portion 430. The fastening portion 410 and the blocking portion 420 are respectively connected with opposite ends of the connecting portion 430. The connecting portion 430 extends along an axis A of the receptacle 20 (shown in FIG. 3) and is sleeved on the assembling portion 220 of the receptacle 20.

According to one embodiment of the present disclosure, the blocking portion of the ferrule fastening component includes a hook structure. As shown in FIG. 3 and FIG. 4, the blocking portion 420 of the ferrule fastening component 40 includes a hook structure 421. A taper 4211 of the hook structure 421 touches the ferrule 30 for confining the movement of the ferrule 30. The hook structure 421 is favorable for enhancing the structural strength of the blocking portion 420. It is worth noting that the protective scope of the present disclosure is not limited to the shape of the hook structure 421. In some embodiments, the hook structure 421 includes a round corner touching the ferrule.

Figure 5:
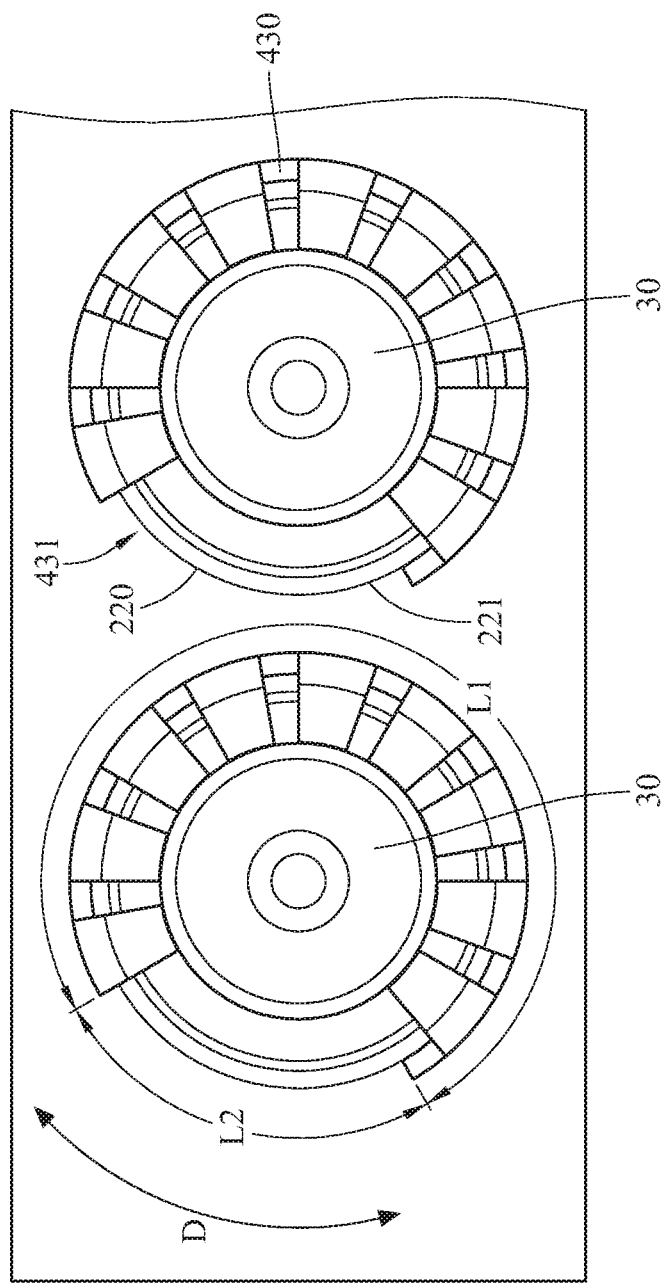
FIG. 5 is a front view of the optical subassembly in FIG. 2.

According to one embodiment of the present disclosure, an opening of the connecting portion of the ferrule fastening component exposes an annular outer surface of the receptacle. Please refer to FIG. 5, which is a front view of the optical subassembly in FIG. 2. As shown in FIG. 3 and FIG. 5, the connecting portion 430 of the ferrule fastening component 40 covers a part of an annular outer surface 221 of the assembling portion 220 of the receptacle 20, and a cross section of the connecting portion 430 is in a shape of incomplete circle. An area of the annular outer surface 221 is exposed from an opening 431 of the connecting portion 430. Therefore, it is favorable for a user easily mounting the ferrule fastening component 40 on the receptacle 20 and unmounting the ferrule fastening component 40 from the receptacle 20 by bending the fastening component 40.

According to one embodiment of the present disclosure, the connecting portion of the ferrule fastening component extends along the annular outer surface of the receptacle. As shown in FIG. 3 and FIG. 5, the connecting portion 430 of the ferrule fastening component 40 extends along the annular outer surface 221 of the assembling portion 220 of the receptacle 20 to have a first segment length L1 in a circumferential direction D of the receptacle 20. The area of the annular outer surface 221 exposed from the opening 431 of the connecting portion 430 has a second segment length L2 in the circumferential direction D, and the first segment length L1 is larger than the second segment length L2. More specifically, the segment length L1 is at least three times larger than the second segment length L2. Therefore, the ferrule fastening component 40 may be firmly engaging with the receptacle 20 for preventing any unpredictable misalignment between the ferrule 30 and the receptacle 20.

Figure 6:
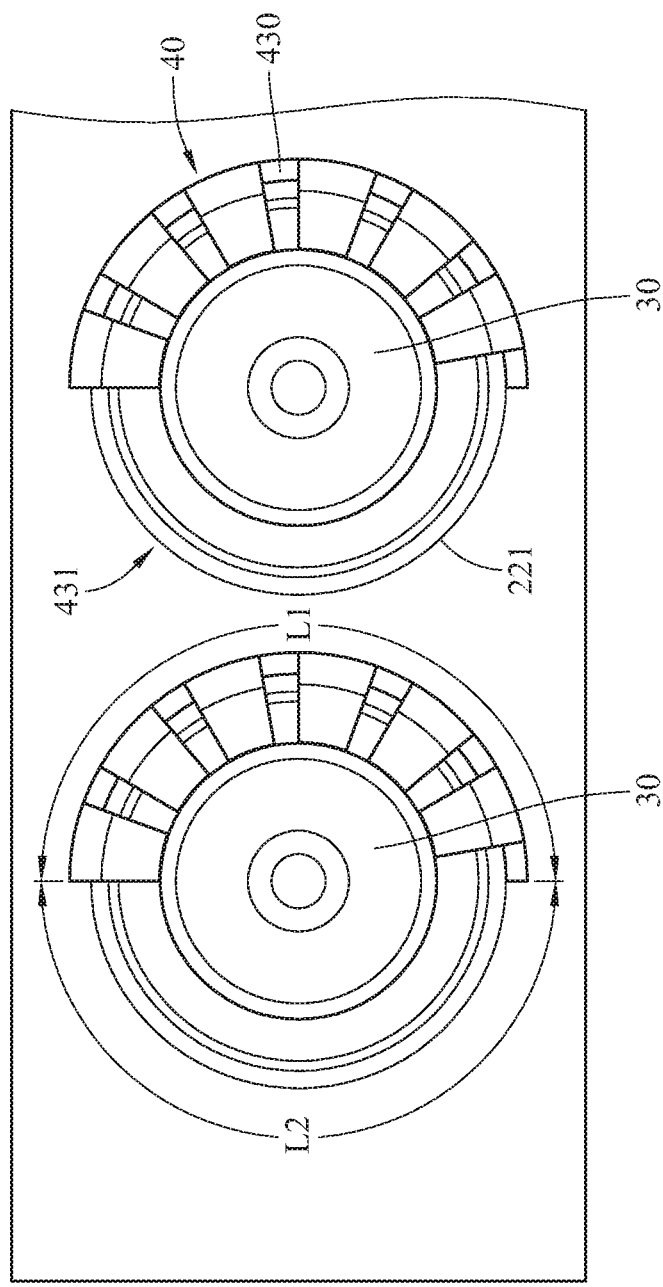
FIG. 6 is a front view of an optical subassembly according to another embodiment of the present disclosure.

It is worth noting that the aforementioned relationship between the first segment length L1 and the second segment length L2 is not limited in view of embodiments in the present disclosure. FIG. 6 is a front view of an optical subassembly according to another embodiment of the present disclosure. In this embodiment, the first segment length L1 the connecting portion 430 of the ferrule fastening component 40 is equal to the second segment length L2 of the area of the annular outer surface 221 exposed from the opening 431.

According to the present disclosure, the fastening portion of the ferrule fastening component is fastened with the receptacle, and the blocking portion of the ferrule fastening component touches the ferrule. Therefore, the ferrule is confined by the ferrule fastening component, rather than by glue used in conventional products. The confinement of the ferrule by ferrule fastening component is favorable for easily unmounting the ferrule when the ferrule fails corresponding coupling tests, such that the user is able to realign the ferrule with the receptacle without damaging optical components of the optical subassembly.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical subassembly, comprising:
a receptacle;
a ferrule connected with the receptacle; and
a ferrule fastening component connected with the receptacle, the ferrule fastening component having a first end that extends to a second end, the first end comprising a fastening portion and the second end comprising a blocking portion, wherein the first end of the ferrule fastening component fastens with the receptacle via the fastening portion, and the second end of the ferrule fastening component confines movement of the ferrule based on the blocking portion touching the ferrule; and
wherein the ferrule fastening component removably mounts to the receptacle via the fastening portion.

2. The optical subassembly according to claim 1, wherein the ferrule fastening component further comprises a connecting portion, the fastening portion and the blocking portion are respectively connected with opposite ends of the connecting portion, and the connecting portion covers a part of an annular outer surface of the receptacle.

3. The optical subassembly according to claim 2, wherein an area of the annular outer surface is exposed from an opening of the connecting portion of the ferrule fastening component.

4. The optical subassembly according to claim 3, wherein the connecting portion of the ferrule fastening component extends along the annular outer surface of the receptacle to have a first segment length, and the area of the annular outer surface exposed from the opening of the connecting portion has a second segment length, and the first segment length is larger than or equal to the second segment length.

5. The optical subassembly according to claim 4, wherein the first segment length is at least three times larger than the second segment length.

6. The optical subassembly according to claim 1, wherein the fastening portion of the ferrule fastening component comprises a hook structure fastened with the receptacle, and the hook structure extends into a groove of the receptacle.

7. The optical subassembly according to claim 6, wherein the receptacle comprises an axial portion and an assembling portion, the assembling portion is sleeved on the axial portion, the axial portion and the assembling portion jointly form the groove and the hook structure of the fastening portion is fastened with the assembling portion.

8. The optical subassembly according to claim 7, wherein the ferrule fastening component further comprises a connecting portion, the fastening portion and the blocking portion are respectively connected with the opposite ends of the connecting portion, and the connecting portion is sleeved on the assembling portion.

9. The optical subassembly according to claim 1, wherein the blocking portion of the ferrule fastening component comprises a hook structure and a taper of the hook structure touches the ferrule.

10. An optical transceiver, comprising the optical subassembly according to claim 1.

11. The optical subassembly of claim 1, wherein the ferrule fastening component is configured to sleeve onto the receptacle.

12. The optical subassembly of claim 1, wherein the fastening portion of the ferrule fastening component comprises a hook structure to engage a groove of the receptacle to mount to the receptacle.

13. A ferrule fastening component for coupling a ferrule to a receptacle of an optical subassembly, the ferrule fastening component comprising:

a connecting port having a first end that extends to a second end;

a fastening portion defined by the first end of the connecting port to receive an axial portion of the receptacle and fasten thereto, wherein the fastening portion removably mounts the ferrule fastening component to the receptacle; and a blocking portion defined by the second end of the connecting port, the blocking portion to touch the ferrule and confine movement of the ferrule when fastened thereto.

14. The ferrule fastening component of claim 13, wherein the fastening portion comprises a hook structure to engage a groove of the receptacle.

15. The ferrule fastening component of claim 13, wherein ferrule fastening component is bendable to unmount the ferrule fastening component from the receptacle.

* * * * *